(12) United States Patent
Qiao et al.

(10) Patent No.: US 11,996,733 B2
(45) Date of Patent: May 28, 2024

(54) PERMANENT MAGNET MOTOR, COMPRESSOR AND AIR CONDITIONER

(71) Applicant: GUANGDONG MEIZHI COMPRESSOR CO., LTD., Guangdong (CN)

(72) Inventors: Zhengzhong Qiao, Guangdong (CN); Linshu Mao, Guangdong (CN); Xiaohua Qiu, Guangdong (CN); Fei Xu, Guangdong (CN); Yulong Wang, Guangdong (CN)

(73) Assignee: GUANGDONG MEIZHI COMPRESSOR CO., LTD., Guangdong (CN)

( * ) Notice: Subject to any disclaimer, the term of this patent is extended or adjusted under 35 U.S.C. 154(b) by 677 days.

(21) Appl. No.: 17/126,559

(22) Filed: Dec. 18, 2020

(65) Prior Publication Data

US 2021/0143690 A1    May 13, 2021

Related U.S. Application Data

(63) Continuation of application No. PCT/CN2018/115876, filed on Nov. 16, 2018.

(30) Foreign Application Priority Data

Jul. 27, 2018  (CN) .......................... 201810843967.4
Jul. 27, 2018  (CN) .......................... 201821213287.6

(51) Int. Cl.
*H02K 1/16*  (2006.01)
*H02K 1/02*  (2006.01)
(Continued)

(52) U.S. Cl.
CPC ............... *H02K 1/165* (2013.01); *H02K 1/02* (2013.01); *H02K 3/18* (2013.01); *H02K 3/28* (2013.01); *H02K 2213/03* (2013.01)

(58) Field of Classification Search
CPC ............ H02K 1/165; H02K 1/02; H02K 3/18; H02K 3/28; H02K 2213/03; H02K 1/27;
(Continued)

(56) References Cited

U.S. PATENT DOCUMENTS 6,979,924 B2  12/2005  Nishiyama et al.
9,712,008 B2   7/2017  Ombach et al.
(Continued)

FOREIGN PATENT DOCUMENTS

CN    103633805 A    3/2014
CN    104767306 A    7/2015
(Continued)

OTHER PUBLICATIONS

Noguchi, Toshihiko et al., "1.5-kW, 150,000-r/min Ultra High-Speed PM Motor Fed by 12-V Power Supply for Automotive Supercharger," Oct. 6, 2009, 2009 13th European Conference on Power Electronics and Applications (Year: 2009).*

(Continued)

*Primary Examiner* — Tulsidas C Patel
*Assistant Examiner* — Joshua Kiel M Rodriguez
(74) *Attorney, Agent, or Firm* — Scully, Scott, Murphy & Presser, P.C.

(57) ABSTRACT

A permanent magnet motor, a compressor and an air conditioner are disclosed. The permanent magnet motor has a stator and a rotor. The stator has a stator core and a stator winding. The rotor is spaced apart from the stator in an inner-outer direction. The rotor has a rotor core and a permanent magnet embedded in the rotor core. A maximum distance between an outer peripheral contour of a cross section of the rotor and a center of the cross section of the rotor is $D_1$, an axial length of rotor core is L, and a rated (Continued)

power of permanent magnet motor is P. $D_1$, L and P satisfy: $D_1/L \geq 1.7$ and $P/(D_1^2 \times L) \geq 8.5$, and the unit of P is W, and the unit of $D_1$ and L is cm.

10 Claims, 6 Drawing Sheets

(51) Int. Cl.
    *H02K 3/18*     (2006.01)
    *H02K 3/28*     (2006.01)

(58) Field of Classification Search
    CPC .......... H02K 21/14; H02K 1/145; H02K 1/16; H02K 3/12
    See application file for complete search history.

(56) References Cited

U.S. PATENT DOCUMENTS

| | | | |
|---|---|---|---|
| 2015/0263573 A1 | 9/2015 | Sathyan et al. | |
| 2016/0329758 A1* | 11/2016 | Flynn | H02K 21/14 |

FOREIGN PATENT DOCUMENTS

| | | | |
|---|---|---|---|
| CN | 105099113 A | | 11/2015 |
| CN | 205846884 U | | 12/2016 |
| JP | 2002-503078 A | | 1/2002 |
| JP | 2002503078 A | | 1/2002 |
| JP | 2007-028714 A | | 2/2007 |
| JP | 2007028714 A | | 2/2007 |
| JP | 2011-083146 A | | 4/2011 |
| JP | 2011083146 A | | 4/2011 |
| JP | 2013055775 A | * | 3/2013 |
| JP | 2015-002650 A | | 1/2015 |
| KR | 20150033727 A | | 4/2015 |
| WO | 2013/026088 A1 | | 2/2013 |
| WO | 2017/134740 A1 | | 8/2017 |
| WO | 2017134740 A1 | | 8/2017 |

OTHER PUBLICATIONS

English translation of JP-2013055775-A (Year: 2013).*
Qu, Ronghai et al. "Performance comparison of dual-rotor radial-flux and axial-flux permanent-magnet BLDC machines," Jul. 15, 2003, IEEE International Electric Machines and Drives Conference, 2003. IEMDC'03. (Year: 2003).*
Noguchi, T. et al., "1.5-kW, 150,000-1/min Ultra High-Speed PM Motor Fed by 12-V Power Supply for Automotive Supercharger", Sep. 8, 2009, p. 1.
Extended European Search Report dated Jul. 23, 2021 received in European Patent Application No. EP 18927601.7.
Notice of Reasons for Refusal dated Mar. 8, 2022 received in Japanese Patent Application No. JP 2020-564378 together with an English language translation.
International Search Report and Written Opinion dated May 6, 2019 received in International Application No. PCT/CN2018/115876 together with an English language translation.
Request for the Submission of an Opinion dated Aug. 19, 2022 received in Korean Patent Application No. KR 10-2020-7033229.
Notice of Reasons for Refusal on Japanese Application No. 2020-564378 dated Nov. 24, 2021.

* cited by examiner

PERMANENT MAGNET MOTOR, COMPRESSOR AND AIR CONDITIONER

CROSS-REFERENCE TO RELATED APPLICATIONS

The present application is a continuation application of PCT International Application No. PCT/CN2018/115876, filed on Nov. 16, 2018, which claims priority to Chinese Patent Application Serial No. 201810843967.4 and No. 201821213287.6, both filed with China National Intellectual Property Administration on Jul. 27, 2018, the entire contents of which are incorporated herein by reference for all purposes. No new matter has been introduced.

FIELD

The present application relates to the field of household appliances, and more particularly to a permanent magnet motor, a compressor, and an air conditioner.

BACKGROUND

In the industry of compressors, rare-earth permanent magnet motors have the highest power density and efficiency. However, the improvement in the power density and efficiency of permanent magnet motors is limited in the related art.

SUMMARY

The present application aims to overcome at least one of the problems existing in the related art. Accordingly, an objective of the present application provides a permanent magnet motor that has higher power density and operational efficiency and is conductive to achieving miniaturization and cost reduction.

Another objective of the present application is to provide a compressor having the permanent magnet motor.

Another objective of the present application is to provide an air conditioner having the above compressor.

A permanent magnet motor according to embodiments of a first aspect of the present disclosure includes: a stator including a stator core and a stator winding, the stator core including a plurality of stator teeth arranged along a peripheral direction of the stator core, a stator slot being defined between two adjacent stator teeth, and the stator winding being wound on the stator tooth; and a rotor spaced apart from the stator in an inner-outer direction, and including a rotor core and a permanent magnet embedded in the rotor core. A maximum distance between an outer peripheral contour of a cross section of the rotor and a center of the cross section of the rotor is $D_1$, an axial length of the rotor core is L, a rated power of the permanent magnet motor is P, and $D_1$, L and P satisfy: $D_1/L \geq 1.7$ and $P/(D_1^2 \times L) \geq 8.5$, in which a unit of P is W and units of $D_1$ and L are cm.

For the permanent magnet motor according to the embodiments of the present disclosure, by setting the relationship among the maximum distance $D_1$ between the outer peripheral contour of the cross section of the rotor and the center of the cross section of the rotor, the axial length L of the rotor core, and the rated power P of the permanent magnet motor to satisfy $D_1/L \geq 1.7$ and $P/(D_1^2 \times L) \geq 8.5$, the flat design of the rotor can be achieved, the power density of the permanent magnet motor can be improved, the high efficiency of the permanent magnet motor can be realized, and at the same time the volume of the permanent magnet motor can be reduced, which is convenient to realize the miniaturization of the permanent magnet motor and reduce the costs.

According to some embodiments of the present disclosure, the stator is fitted over an outer side of the rotor, and a maximum distance between an outer peripheral contour of a cross section of the stator and a center of the cross section of the stator is $D_2$, wherein $D_2$ satisfies: $D_2/L \geq 3$, and a unit of D2 is cm.

According to some embodiments of the present disclosure, the stator winding is a concentrated winding, and a conductor of the stator winding is a copper wire.

According to some embodiments of the present disclosure, the number of poles of the rotor is Q, and Q satisfies: $Q \geq 8$.

According to some embodiments of the present disclosure, when the number of the stator slots is nine, Q satisfies: Q=8 or Q=10.

According to some embodiments of the present disclosure, the permanent magnet is made of sintered Nd—Fe—B.

According to some embodiments of the present disclosure, the stator tooth includes a yoke portion and a tooth portion that are arranged along a radial direction of the stator core; the stator winding is wound on the tooth portion; yoke portions of two adjacent stator teeth are connected by welding or pivotably connected.

According to some embodiments of the present disclosure, two axial ends of the rotor are each provided with an end plate to define an axial movement of the permanent magnet along the rotor core, and the end plate is made of a non-magnetic material.

A compressor according to embodiments of a second aspect of the present disclosure includes a permanent magnet motor according to the above embodiments of the first aspect of the present disclosure.

For the compressor according to the embodiments of the present disclosure, by using the above permanent magnet motor, the operation power of the compressor can be improved, and a miniaturization design of the compressor can be realized to reduce space occupied by the compressor.

An air conditioner according to embodiments of a third aspect of the present disclosure includes a compressor according to the above embodiments of the second aspect of the present disclosure.

For the air conditioner according to the embodiments of the present disclosure, by using the above compressor, the cooling/heating efficiency of the air conditioner can be improved, and the space occupied by the air conditioner can be reduced.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These above and/or additional aspects and advantages of embodiments of the present disclosure will become apparent and more readily appreciated from the following descriptions made with reference to the accompanying drawings, in which.

Figure 1:
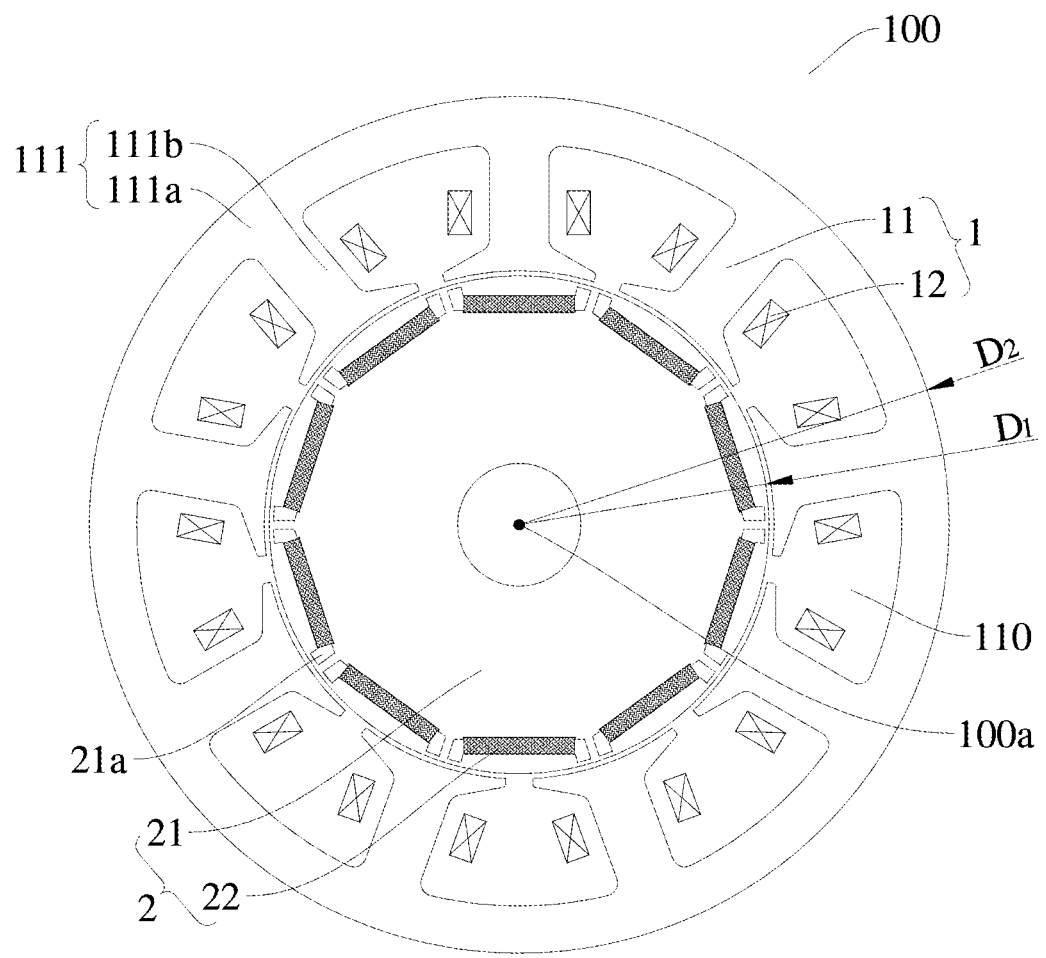
FIG. 1 is a partial schematic view of a permanent magnet motor according to an embodiment of the present disclosure.

The following is description of reference numerals of the figures:

compressor 200, housing 101, air inlet 101a, air outlet 101b, crankshaft 102, compressing mechanism 103, cylinder 103a, primary bearing 103b, auxiliary bearing 103c, piston 103d, counterbalance block 104, permanent magnet motor 100, central axis 100a of permanent magnet motor, stator 1, stator core 11, stator winding 12, stator slot 110, stator tooth 111, yoke portion 111a, tooth portion 111b, rotor 2, rotor core 21, permanent magnet slot 21a, permanent magnet 22, end plate 3, insulating end plate 4, mounting post 41, guiding portion 411, insulating member 5.

DETAILED DESCRIPTION OF EMBODIMENTS

Embodiments of the present disclosure will be described in detail, and the examples of the embodiments will be illustrated in the accompanying drawings. The same or similar elements and the elements having same or similar functions are denoted by like reference numerals throughout the description. The embodiments described herein with reference to the drawings are exemplary, and used to generally understand the present disclosure. The embodiments shall not be construed to limit the present disclosure.

A permanent magnet motor 100 according to certain embodiments of a first aspect of the present disclosure will be described with reference FIGS. 1-6.

As shown in FIGS. 1-6, the permanent magnet motor 100 according to the embodiments of the present disclosure includes a stator 1 and a rotor 2.

The stator 1 includes a stator core 11 and a stator winding 12. The stator core 11 includes a plurality of stator teeth 111 arranged along a peripheral direction of the stator core 11. A stator slot 110 is defined between two adjacent stator teeth 111. The stator winding 12 is wound around the stator tooth 111. The rotor 2 is spaced apart from the stator 1 in an inner-outer (such as, radially inward and outward) direction. The rotor 2 includes a rotor core 21 and a permanent magnet 22 at least partially embedded in the rotor core 21. A maximum distance between an outer peripheral contour of a cross section of the rotor 2 and a center of the cross section of the rotor 2 is $D_1$, an axial length of the rotor core is L, a rated power of the permanent magnet motor 100 is P, and $D_1$, L and P satisfy $D_1/L \geq 1.7$ and $P/(D_1^2 \times L) \geq 8.5$, in which a unit of P is W (watt), and units of $D_1$ and L are cm (centimeter).

For example, as shown in FIGS. 1 to 4, the plurality of stator teeth 111 can be sequentially connected end to end along an axial direction of the stator core 11, and the stator winding 12 is located in the stator slot 110. The rotor core 21 may be formed with a plurality of permanent magnet slots 21a arranged at intervals along a peripheral direction of the rotor core 21, and each permanent magnet slot 21a can penetrate both end surfaces of the rotor core 21 along an axial direction of the rotor core 21. A plurality of permanent magnets 22 can be embedded in the plurality of permanent magnet slots 21a correspondingly, such that at least one permanent magnet 22 is embedded in each permanent magnet slot 21a to form a magnetic pole.

An outer peripheral contour of a cross section of the rotor core 21 may be formed in a substantially circular shape, and the center of the cross section of the rotor 2 may be a center of the circular shape. A maximum distance of the outer peripheral contour of the cross section of the rotor core 21 can be $D_1$, and the relationship between $D_1$ and L satisfies $D_1/L \geq 1.7$ ("1.7" is a dimensionless coefficient), which can improve a flattening degree of the rotor 2 to a certain degree, achieve a flat design of the rotor 2, and be advantageous to increasing the power density and realizing high efficiency of the permanent magnet motor 100. However, to a certain extent, it may be not convenient to realize a miniaturization design of the permanent magnet motor 100 due to $D_1/L \geq 1.7$. By setting the rated power P of the permanent magnet motor 100 to satisfy $P/(D_1^2 \times L) \geq 8.5$ (the unit is W/cm³), on the premise of the same rated power, the volume of the rotor 2 of the present disclosure can be made smaller, thus reducing the volume of the permanent magnet motor 100. Compared with the permanent magnet motor 100 of the traditional art, the volume of the permanent magnet motor 100 according to the present disclosure can be reduced by about 10%, and therefore under the premise of ensuring the efficient operation of the permanent magnet motor 100, the miniaturization design of the permanent magnet motor 100 can be realized, and the costs in particular the material cost of the permanent magnet motor 100 can be reduced.

The permanent magnet motor 100 can be a single permanent magnet motor, and for the single permanent magnet motor, a ratio of P to $(D_1^2 \times L)$ can be a fixed value. "The rated power P" may refer to an input power of the permanent magnet motor 100 under a rated cooling condition of an air conditioner, when the permanent magnet motor 100 is applied to a compressor 200 and the compressor 200 is applied to the air conditioner. The term "a plurality of" means two or more than two.

For the permanent magnet motor 100 according to the embodiments of the present disclosure, by setting the relationship among the maximum distance $D_1$ between the outer peripheral contour of the cross section of the rotor 2 and the center of the cross section of the rotor 2, the axial length L of the rotor core 21, and the rated power P of the permanent magnet motor 100 to satisfy $D_1/L \geq 1.7$ and $P/(D_1^2 \times L) \geq 8.5$, the flat design of the rotor 2 can be achieved, the power density of the permanent magnet motor 100 can be improved, the high efficiency of the permanent magnet motor 100 can be realized, and at the same time the volume of the permanent magnet motor 100 can be reduced, which is convenient to realize the miniaturization of the permanent magnet motor 100 and reduce the costs.

Figure 2:
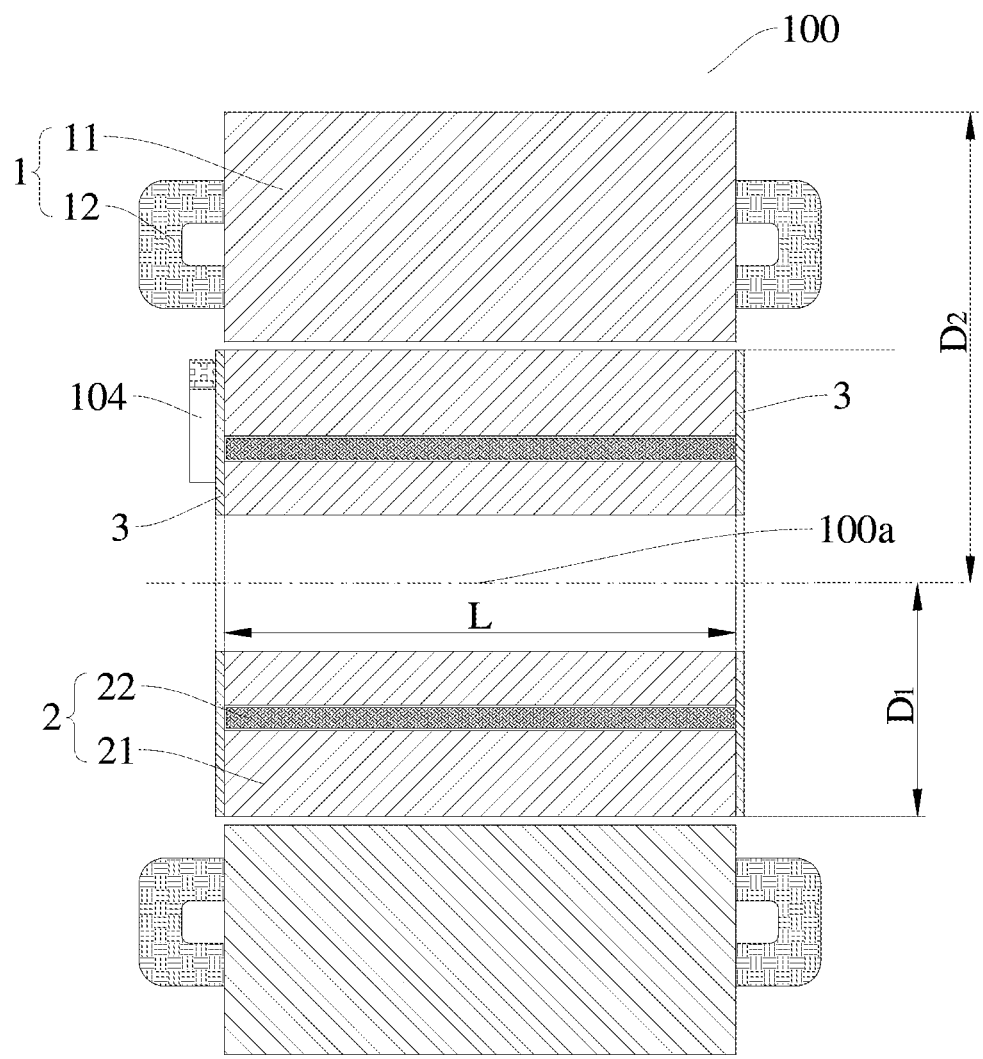
FIG. 2 is a sectional view of the permanent magnet motor shown in FIG. 1.

Optionally, as shown in FIGS. 1 and 2, the stator 1 is fitted over an outer side of the rotor 2, and in such a case, the permanent magnet motor 100 is an inner rotor motor. A maximum distance $D_2$ between an outer peripheral contour of a cross section of the stator 1 and a center of the cross section of the stator 1 satisfies $D_2/L \geq 3$ ("3" is a dimensionless coefficient), in which a unit of $D_2$ is cm. To a certain extent, the flatness of the stator 1 can be enhanced, and a flat design of the stator 1 can be realized, which is conductive to further improving the power density of the permanent magnet motor 100 and realizing the efficient operation of the permanent magnet motor 100. An axial length of the stator core 11 may be substantially equal to the axial length L of the rotor core 21, that is, the axial length of the stator core 11 is equal to the axial length L of the rotor core 21, or the axial length of the stator core 11 is different from the axial length L of the rotor core 21 but with a small difference.

It can be understood that the rotor 2 can be fitted over an outer side of the stator 1, and in such a case, the permanent magnet motor 100 is an outer rotor motor.

For example, the stator winding 12 is a concentrated winding that can be applied to a salient pole stator 1. It is usually wound into a rectangular coil, wrapped with warp tapes and shaped, treated by dipping paint and dried, and wound on the stator 1. In such a way, the processing cost of the stator 1 can be reduced, at the same time, the miniaturization design requirement of the permanent magnet motor 100 can be easily satisfied, and an end length of the concentrated winding is relatively short, which can reduce the resistance of the permanent magnet motor 100 and ensure the efficiency of the permanent magnet motor 100. A conductor of the stator winding 12 is a copper wire with sufficient electrical conductivity and mechanical properties and is easy to process.

Optionally, the number of poles of the rotor 2 is Q that satisfies: $Q \geq 8$. Compared with a rotor 2 provided with four or six magnetic poles in the traditional art, due to the increased number of magnetic poles, the power density of the permanent magnet motor 100 can be more effective, and at the same time the copper loss of the permanent magnet motor 100 can be reduced, further realizing the high efficiency of the permanent magnet motor 100 and reducing the structural size of the rotor 2, which is further conductive to achieving the miniaturization of the permanent magnet motor 100.

Further optionally, the number Q of poles of the rotor 2 satisfies: $8 \leq Q \leq 14$, so as to avoid significant increase of the iron loss of the permanent magnet motor 100 caused by the excessive number of poles of the rotor 2 and avoid inhibiting the efficiency improvement of the permanent magnet motor 100 to a certain extent, thereby ensuring the performance of the permanent magnet motor 100.

For example, when there are nine stator slots 110, Q satisfies: Q=8 or Q=10, that is, the number of the stator slots 110 is nine and the number Q of poles of the rotor 2 is eight; or the number of the stator slots 110 is nine and the number Q of poles of the rotor 2 is ten (for example, as shown in FIG. 1).

Certainly, the number of the stator slots 110 and the number of poles of the rotor 2 can also be set in other ways. For example, the number of the stator slots 110 is twelve and the number Q of poles of the rotor 2 is fourteen; or the number of the stator slots 110 is twelve and the number Q of poles of the rotor 2 is ten. However, the numbers are not limited thereto.

Optionally, the permanent magnet 22 is made of sintered Nd-Fe-B, so that the permanent magnet 22 can have excellent magnetic properties and the reliability of the permanent magnet 22 can be guaranteed.

In some embodiments of the present disclosure, as shown in FIG. 1, each stator tooth 111 includes a yoke portion 111a and a tooth portion 111b arranged in a radial direction of the stator core 11. The yoke portions 111a of the plurality of stator teeth 111 are sequentially connected, in the circumferential direction, end to end to form a ring-shaped stator yoke. The yoke portions 111a of two adjacent stator teeth 111 can be connected by welding or be pivotably connected. The tooth portions 111b of the plurality of stator teeth 111 are arranged at intervals along a peripheral direction of the permanent magnet motor 100. The stator winding 12 can be wound on the tooth portion 111b of the stator tooth 111 to be positioned in the stator slot 110. When the yoke portions 111a of the two adjacent stator teeth 111 are pivotably connected, a peripheral end of the yoke portion 111a of one of the two adjacent stator teeth 111 may be provided with a pivoting protrusion, and a peripheral end of the yoke portion 111a of the other one of the two adjacent stator teeth 111 may be provided with a pivoting opening; the pivoting protrusion can be correspondingly fitted in the pivoting opening, such that the one of the two adjacent stator teeth 111 can rotate around a central axis of the pivoting opening within a certain range relative to the other one of the two adjacent stator teeth 111, so as to facilitate the rapid assembly of the stator core 11 and improve the assembly efficiency of the stator 1.

Figure 3:
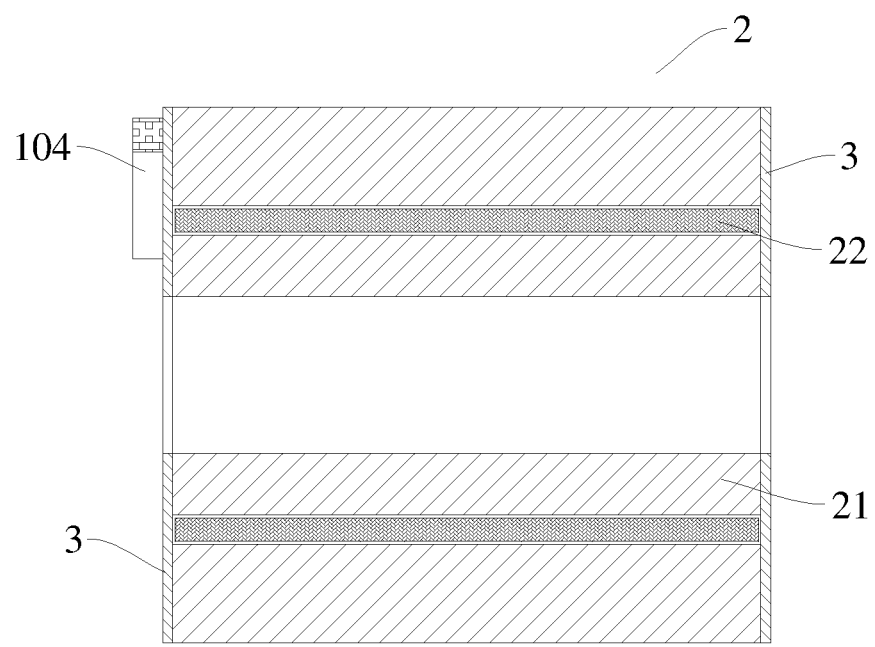
FIG. 3 is a sectional view of a rotor of the permanent magnet motor shown in FIG. 2.

For example, two axial ends of the rotor 2 are each provided with an end plate 3 to define an axial movement of the permanent magnet 22 along the rotor core 21, and the end plate 3 is made of a non-magnetic material. For example, as shown in FIGS. 2 and 3, there are two end plates 3 and each end plate 3 can be formed as a plate-like structure. The end plate 3 can be arranged to abut against an end surface of the rotor core 21 to block the movement of the permanent magnet 22, which achieves the axial limitation on the permanent magnet 22, avoids the separation of the permanent magnet 22 from the rotor core 21, and ensures the structural stability of the rotor 2. The end plate 3 is made of the non-magnetic material, and for example, may be made of stainless steel, so that the end plate 3 can shield the magnetic leakage of the rotor 2.

A compressor 200 according to embodiments of a second aspect of the present disclosure includes the permanent magnet motor 100 according to the above embodiments of the first aspect of the present disclosure. The compressor 200 may be applied to household appliances, for example, an air conditioner; the compressor 200 may be a vertical compressor 200; the compressor 200 may be a single-cylinder compressor 200 or a multi-cylinder compressor 200. However, the compressor is not limited thereto.

Figure 7:
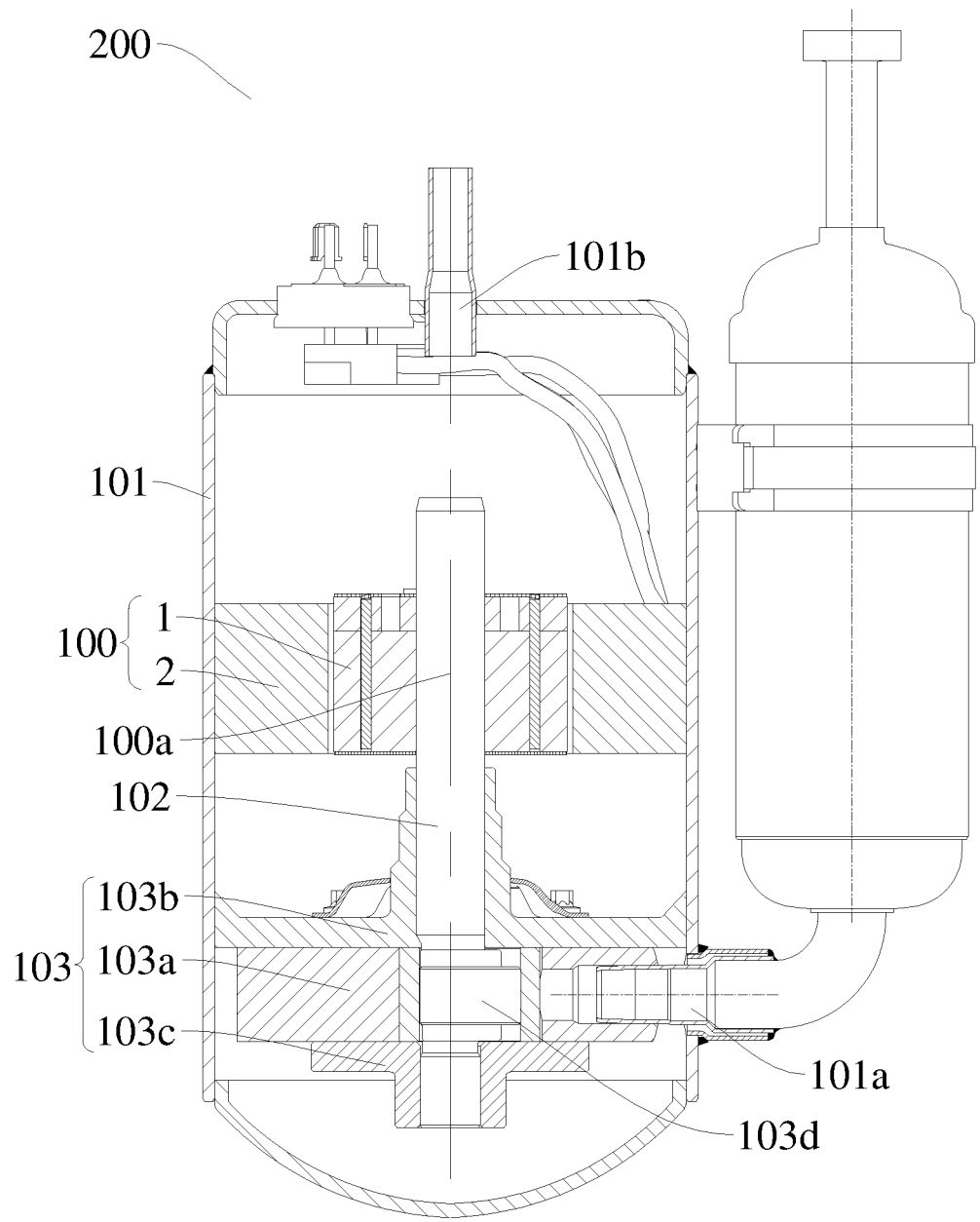
FIG. 7 is a sectional view of a compressor according to an embodiment of the present disclosure.

For example, as shown in FIG. 7, the compressor 200 may be a single-cylinder 200 and the compressor 200 may be a rotary compressor 200. The compressor 200 can further include a housing 101, a crankshaft 102, and a compressing mechanism 103. The crankshaft 102, the compressing mechanism 103, and the permanent magnet motor 100 are all arranged in the housing 101. The housing 101 may be formed with an air outlet 101b on its top and an air inlet 101a in its peripheral wall. The crankshaft 102 is arranged to pass through the permanent magnet motor 100 and the compressing mechanism 103, so that when the permanent magnet motor 100 is running, the rotor 2 rotates to drive the compressing mechanism 103 to operate by the crankshaft 102 to implement suction, compression and discharge of the refrigerant. The compressing mechanism 103 includes a cylinder 103a as well as a primary bearing 103b and an auxiliary bearing 103c located on both ends of the cylinder 103a respectively. The compressing mechanism 103 defines a compression chamber therein, and a compressing structural portion can be formed with an inlet and an outlet that are both in communication with the compression chamber. A piston 103d is provided in the compression chamber, and an eccentric portion of the crankshaft 102 is arranged in and passes through the piston 103d to drive the piston 103d to operate eccentrically. The inlet of the compressing structural portion is in communication with the air inlet 101a to allow the refrigerant to flow into the compression chamber through the air inlet 101a and the inlet to be compressed. An end of the rotor 2 of the permanent magnet motor 100 may be provided with a counterbalance block 104 to achieve dynamic balance of the crankshaft 102.

For the compressor 200 according to the embodiments of the present disclosure, the operation power of the compressor can be improved, and a miniaturization design of the compressor can be realized to reduce space occupied by the compressor, by adopting the above-mentioned permanent magnet motor 100.

An air conditioner according to embodiments of a third aspect of the present disclosure includes a compressor according to the above embodiments of the second aspect of the present disclosure. Specifically, the air conditioner may include a casing, and the compressor can be arranged in the casing. The air conditioner can realize cooling and/or heating, and can be a cabinet type air conditioner, a wall-mounted air conditioner, a built-in air conditioner, or a window air conditioner and so on.

For the air conditioner according to the embodiments of the present disclosure, the cooling/heating efficiency of the air conditioner can be improved and the space occupied by the air conditioner can be reduced, by using the above-mentioned compressor 200.

Other configurations and operations of the air conditioner according to the embodiments of the present disclosure are known to those of ordinary skill in the art, and will not be described in detail here.

Hereinafter, the permanent magnet motor 100 according to the embodiments of the present disclosure will be described in detail by a specific embodiment with reference to FIGS. 1-6. It should be understood that the following description is only exemplary, rather than a specific limitation to the present disclosure.

In the specification, it should be understood that the terms "center," "lateral," "length," "upper," "lower," "inner," "outer," "axial," "radial," "circumferential" and the like refer to the orientation or position relationship shown in the drawings. These terms are only for the convenience and simplification of description and do not indicate or imply that the device or element referred to must have a particular orientation or be constructed and operated in a specific orientation. Therefore, these terms shall not be understood as limitation on the present disclosure.

As shown in FIGS. 1-6, the permanent magnet motor 100 includes a stator 1 and a rotor 2. The rotor 2 includes a rotor core 21 and ten permanent magnets 22. An outer peripheral contour of a cross section of the rotor core 21 is circular. The rotor core 21 is formed by stacking a plurality of second electromagnetic steel sheets along an axial direction of the permanent magnet motor 100. When magnetized to 1.5T at a frequency of 50 Hz, a measured value of iron loss of the second electromagnetic steel sheets does not exceed 2.5 W/kg. The rotor core 21 is formed with ten permanent magnet slots 21a arranged at intervals in a peripheral direction of the rotor core 21, and each permanent magnet slot 21a can penetrate both end surfaces of the rotor core 21 along an axial direction of the rotor core 21. Ten permanent magnets 22 are embedded in the ten permanent magnet slots 21a in one-to-one correspondence, so that the ten permanent magnets 22 are embedded in the rotor core 21 and the number Q of poles of rotor 2 is ten, in which each permanent magnet 22 is made of sintered Nd—Fe—B.

The stator 1 is fitted over an outer side of the rotor 2, and the stator 1 includes a stator core 11 and a stator winding 12. The stator core 11 is formed by stacking a plurality of first electromagnetic steel sheets along the axial direction of the permanent magnet motor 100. When magnetized to 1.5T at a frequency of 50 Hz, a measured value of iron loss of the first electromagnetic steel sheets is 2.3 W/kg. The stator core 11 includes nine stator teeth 111 arranged along a peripheral direction of the permanent magnet motor 100. Each stator tooth 111 includes a yoke portion 111a and a tooth portion 111b that are arranged opposite to each other in a radial direction of the permanent magnet motor 100, and the tooth portion 111b is located inside the yoke portion 111a. The yoke portions 111a of a plurality of stator teeth 111 are sequentially connected end to end to form a ring-shaped stator yoke. The tooth portions 111b of the plurality of stator teeth 111 are arranged at intervals along the peripheral direction of the permanent magnet motor 100, and a stator slot 110 is defined between two adjacent stator teeth 111, that is, there are nine stator slots 110. The stator winding 12 is wound on the tooth portion 111b of the stator tooth 111 and located in the stator slot 110. The stator winding 12 is a concentrated winding, and a conductor of the stator winding 12 is a copper wire. An insulating member 5 is provided in the stator slot 110 to separate coils of the stator winding 12 from the stator tooth 111 to realize insulation, and the insulating member 5 may be insulating paper.

A maximum distance between an outer peripheral contour of a cross section of the rotor 2 and a center of the cross section of the rotor 2 is $D_1$; an axial length of the rotor core 21 is L; a rated power of the permanent magnet motor 100 is P; and a maximum distance between an outer peripheral contour of a cross section of the stator 1 and a center of the cross section of the stator 1 is $D_2$. $D_1$, L, P and $D_2$ satisfy: $D_1/L \geq 1.7$, $P/(D_1^2 \times L) \geq 8.5$, and $D_2/L \geq 3$, in which a unit of P is W, and units of $D_1$, L and $D_2$ are cm.

Here, it should be noted that an "outer" direction refers to a direction away from a central axis 100a of the permanent magnet motor, and an opposite direction is defined as an "inner" direction; the "axial direction of the permanent magnet motor 100" is parallel to an extension direction of the central axis 100a of the permanent magnet motor.

As shown in FIGS. 2, 3, 5 and 6, both axial ends of the rotor 2 are each provided with an end plate 3 to define an axial movement of the permanent magnet 22 along the rotor core 21, and the end plate 3 is made of stainless steel. Both axial ends (e.g., upper and lower ends in FIG. 5) of the stator 1 are each provided with an insulating end plate 4. Two insulating end plates 4 are mounted at end surfaces of two axial ends of the stator core 11 respectively. Each insulating end plate 4 is formed as an insulating skeleton. Each insulating end plate 4 is provided with a plurality of mounting posts 41 arranged at intervals along a peripheral direction of the stator core 11, and each mounting post 41 can extend toward the stator core 11 along an axial direction of the stator core 11. End surfaces of the two axial ends of the stator core 11 are each provided with a plurality of mounting holes, and each mounting hole can be formed by recessing a part of the end surface of the stator core 11. The plurality of mounting posts 41 are fitted in the plurality of mounting holes in one-to-one correspondence, so that the insulating end plate 4 can be quickly mounted on the stator core 11.

Each mounting post 41 may be formed as a cylindrical structure. A free end of each mounting post 41 may be provided with a guiding portion 411, and an outer peripheral wall of the guiding portion 411 forms a guiding surface. The guiding portion 411 may be formed as a truncated cone structure, so that a cross sectional area of the guiding portion 411 gradually decreases along the axial direction of the stator core 11 from one end of the guiding portion 411 away from a center of the stator core 11 to the other end of the guiding portion 411 adjacent to the center of the stator core 11. Thus, the guiding surface can play a role of guidance during the installation of the insulating end plate 4, which can further improve the installation efficiency of the insulating end plate 4.

Figure 4:
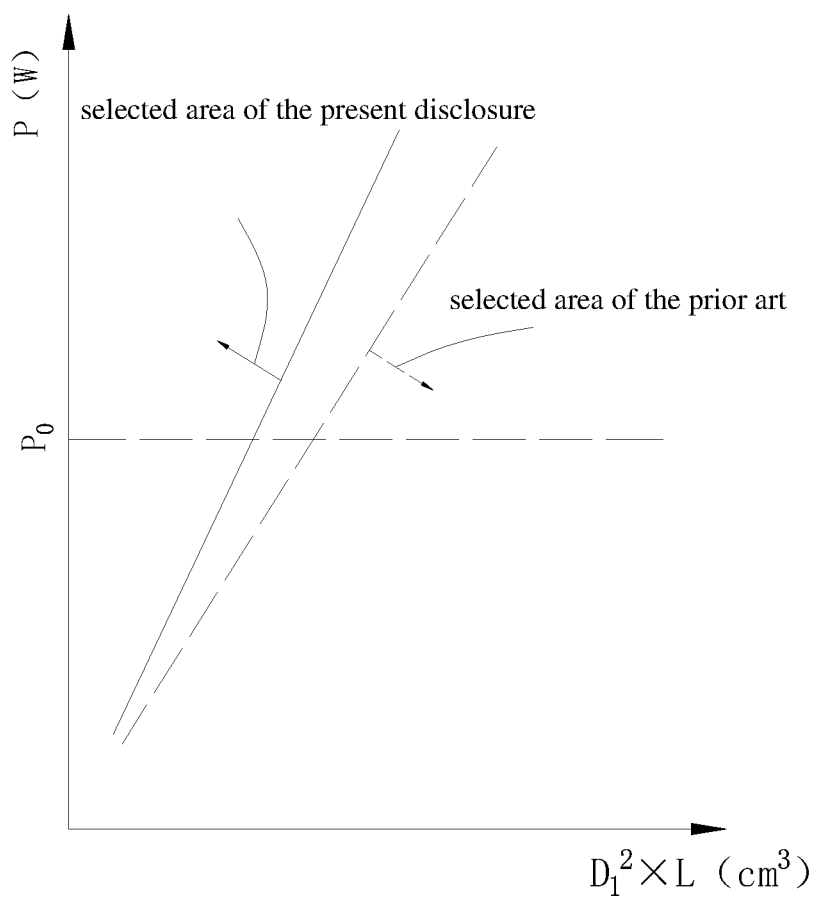
FIG. 4 is a schematic view illustrating a power-volume relationship of a permanent magnet motor according to an embodiment of the present disclosure and a power-volume relationship of a traditional permanent magnet motor.
Figure 5:
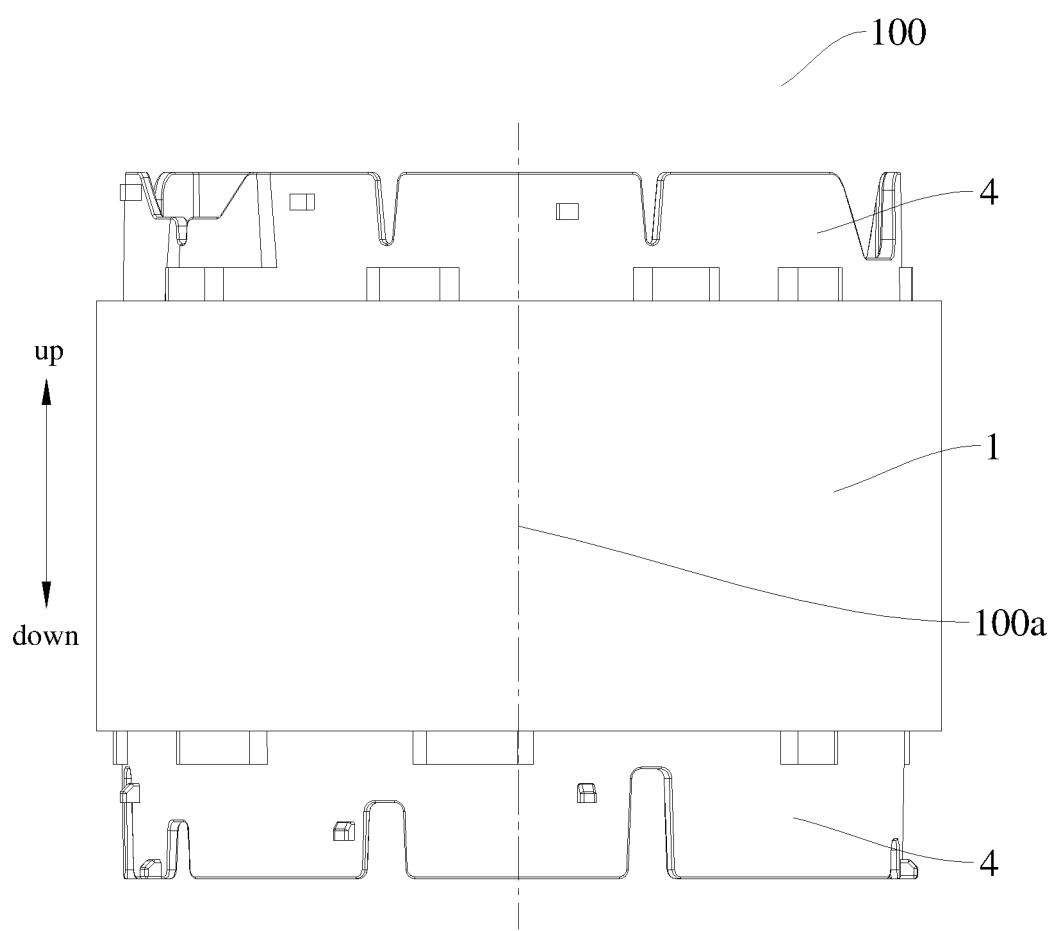
FIG. 5 is another partial schematic view of the permanent magnet motor shown in FIG. 1.
Figure 6:
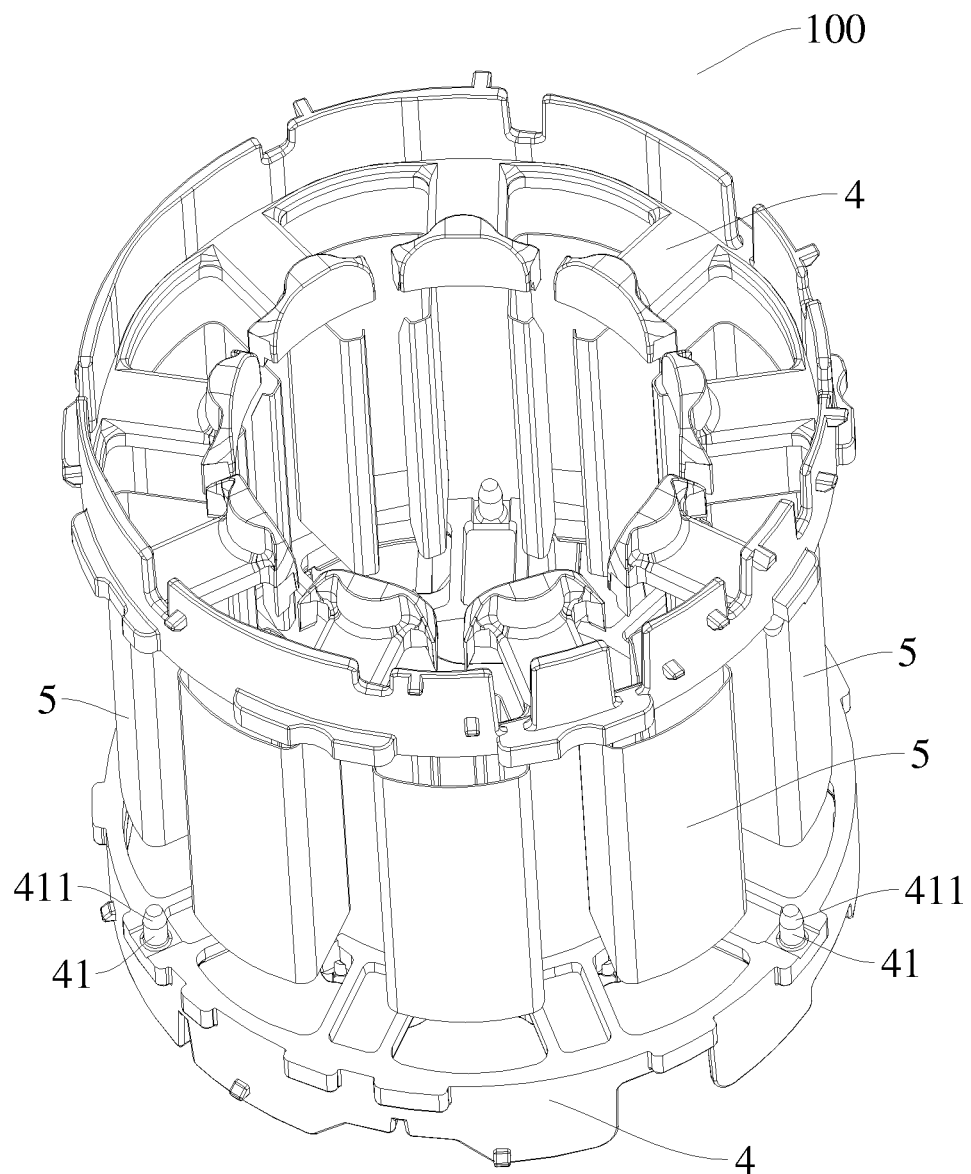
FIG. 6 is yet another partial schematic view of the permanent magnet motor shown in FIG. 1.

For the permanent magnet motor 100 according to the embodiments of the present disclosure, compared with the traditional permanent magnet motor with $D_1/L \leq 1.5$ and $P/(D_1^2 \times L) \leq 8$, the power density and thus the efficiency of the permanent magnet motor 100 according to the present disclosure can be further improved, which is conductive to realizing the high efficiency of the permanent magnet motor 100. As shown in FIG. 4, under the same input power $P_0$, a value of $(D_1^2 \times L)$ of the permanent magnet motor 100 of the present disclosure is smaller than that of the traditional permanent magnet motor, so that the volume of the permanent magnet motor of the present disclosure can be small, realizing the miniaturization and reducing the cost of the permanent magnet motor 100.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, modifications, alternatives and variations can be made in the embodiments without departing from principles and purposes of the present disclosure. The scope of the present disclosure is defined by claims or equivalents thereof.

What is claimed is:

1. A permanent magnet motor comprising:
    a stator comprising a stator core and a stator winding, the stator core comprising a plurality of stator teeth arranged along a peripheral direction of the stator core, a stator slot being defined between two adjacent stator teeth, and the stator winding being wound on the stator tooth; and
    a rotor spaced apart from the stator in a radially inner/outer direction, and comprising a rotor core and a permanent magnet embedded in the rotor core, wherein a maximum distance between an outer peripheral contour of a cross section of the rotor and a center of the cross section of the rotor is $D_1$, an axial length of the rotor core is L, a rated power of the permanent magnet motor is P, wherein $D_1$, L and P satisfy: $D_1/L \geq 1.7$ and $P/(D_1^2 \times L) \geq 8.5 (W/cm^3)$, wherein a unit of P is W and units of $D_1$ and L are cm.

2. The permanent magnet motor according to claim 1, wherein the stator is fitted over an outer side of the rotor, and a maximum distance between an outer peripheral contour of a cross section of the stator and a center of the cross section of the stator is $D_2$, wherein $D_2$ satisfies: $D_2/L \geq 3$, and a unit of $D_2$ is cm.

3. The permanent magnet motor according to claim 1, wherein the stator winding comprises a concentrated winding, and a conductor of the stator winding comprises a copper wire.

4. The permanent magnet motor according to claim 1, wherein the number of poles of the rotor is Q, and Q satisfies: $Q \geq 8$.

5. The permanent magnet motor according to claim 4, wherein when the number of the stator slots is nine, Q satisfies: Q=8 or Q=10.

6. The permanent magnet motor according to claim 1, wherein the permanent magnet is made of sintered Nd—Fe—B.

7. The permanent magnet motor according to claim 1, wherein:
    each stator tooth comprises a yoke portion and a tooth portion that are arranged along a radial direction of the stator core;
    the stator winding is wound on the tooth portion; and
    yoke portions of two adjacent stator teeth are pivotably connected or connected by welding.

8. The permanent magnet motor according to claim 1, wherein two axial ends of the rotor are each provided with an end plate to restrict an axial movement of the permanent magnet along the rotor core, and the end plate is made of a non-magnetic material.

9. A compressor comprising the permanent magnet motor according to claim 1.

10. An air conditioner comprising the compressor according to claim 9.

* * * * *